(12) United States Patent
Wad et al.

(10) Patent No.: US 9,074,493 B2
(45) Date of Patent: Jul. 7, 2015

(54) STEAM GENERATION SYSTEMS AND METHODS FOR CONTROLLING OPERATION OF SAME

(75) Inventors: Vijay Subhash Wad, Surat (IN); Steven Di Palma, Sterling, MA (US); Charles William Weidner, Roanoke, VA (US); Maxwell Reeves Erwin, Roanoke, VA (US); Samuel Jacob Wallin, Roanoke, VA (US); Shanmuga Priya Muniyandi, Tamilnadu (IN)

(73) Assignee: General Electric Company, Schenctady, NY (US)

( * ) Notice: Subject to any disclaimer, the term of this patent is extended or adjusted under 35 U.S.C. 154(b) by 452 days.

(21) Appl. No.: 13/306,150

(22) Filed: Nov. 29, 2011

(65) Prior Publication Data
US 2013/0133594 A1 May 30, 2013

(51) Int. Cl.
F22D 5/26 (2006.01)
F01K 13/02 (2006.01)
F01K 7/22 (2006.01)
F22B 1/18 (2006.01)

(52) U.S. Cl.
CPC . *F01K 13/02* (2013.01); *F01K 7/22* (2013.01); *F22B 1/1815* (2013.01)

(58) Field of Classification Search
CPC .......... F01K 7/22; Y02E 20/16; F22B 1/1815
USPC ............. 122/451.1, 451.2, 460, 479.1, 448.1, 122/452, 448.3; 700/301, 299
See application file for complete search history.

(56) References Cited

U.S. PATENT DOCUMENTS

| | | | | |
|---|---|---|---|---|
| 3,828,738 A * | 8/1974 | Frei | ............................ | 122/504.2 |
| 3,943,372 A * | 3/1976 | Smith et al. | ................. | 290/40 R |
| 4,433,646 A * | 2/1984 | Zadiraka | .................... | 122/504.2 |
| 4,572,110 A * | 2/1986 | Haeflich | ....................... | 122/7 R |
| 5,091,844 A * | 2/1992 | Waltz | ............................. | 700/33 |
| 5,181,381 A * | 1/1993 | Gounder | ......................... | 60/648 |
| 5,840,100 A * | 11/1998 | Arencibia, Jr. | .................. | 95/225 |
| 2005/0072380 A1* | 4/2005 | Sohn et al. | ................. | 122/451.1 |
| 2008/0289589 A1* | 11/2008 | Wees et al. | ..................... | 122/7 R |
| 2009/0217665 A1* | 9/2009 | Holzhauer et al. | .............. | 60/645 |
| 2010/0139392 A1* | 6/2010 | Kumar et al. | ............... | 73/290 R |

OTHER PUBLICATIONS

"Control", Feb. 1, 1996, https://canteach.candu.org/Content%20Library/20043708.pdf, p. 1.*
"Boiler Drum Control", Aug. 2010, https://www.isa.org/standards-publications/isa-publications/intech-magazine/2010/august/special-section-flow-and-level-boiler-drum-control/, pp. 1-3.*

* cited by examiner

*Primary Examiner* — Steven B McAllister
*Assistant Examiner* — Steven Anderson, II
(74) *Attorney, Agent, or Firm* — Armstrong Teasdale LLP (57) ABSTRACT

A method for controlling the operation of a steam generation system is provided. Fluid flow is channeled from at least one first boiler within at least one conduit. Fluid flow is added within the conduit from at least one second boiler. At least one operating condition within the first and second boilers is detected. A fluid pressure set point and/or a fluid temperature set point for each boiler is determined based on the operating condition detected for each boiler. A fluid pressure and/or a fluid temperature is maintained within the first and second boiler to be approximately equal to the fluid pressure set point and the fluid temperature set point for each boiler, respectively, prior to fluid flow being channeled and/or during the channeling of fluid flow from the first boiler and/or the second boiler within the conduit to a steam process and/or at least one steam turbine engine.

19 Claims, 2 Drawing Sheets

STEAM GENERATION SYSTEMS AND METHODS FOR CONTROLLING OPERATION OF SAME

BACKGROUND OF THE INVENTION

The field of the invention relates generally to steam generation systems and, more particularly, to systems and methods for use in controlling the operation of steam generation systems.

At least some known steam generation systems, such as combined-cycle power generation systems, may include at least one heat source, such as a gas turbine engine, at least one steam boiler, such as a heat recovery steam generator (HRSG), and at least one steam process or a steam turbine engine (ST). Exhaust gases from the gas turbine engine can be channeled to the HRSG, wherein energy from the exhaust gases is utilized to produce steam. The steam can then be channeled to the steam process or the steam turbine engine for use in generating power therefrom. Some combined-cycle power plants can be configured with multiple gas turbine engines and multiple associated HRSGs, wherein one or more of the gas turbine engines may be coupled in flow communication to at least one of the HRSGs, and at least a single steam turbine engine or a steam process that can utilize steam generated by any or all of the HRSGs. The combined cycle power generation system can be operated at a lower power output by utilizing a single gas turbine and its associated HRSG(s) together with the steam turbine engine. If a higher power output is desired, additional gas turbine engines and their associated HRSGs may be started and operated, wherein the steam from additional HRSGs is blended with steam from the existing HRSG(s) thereby providing increased steam flow to the steam turbine engine or the steam process.

At least some HRSGs may be a multi-stage HRSGs that use heat channeled from exhaust gases from the gas turbine engine. The HRSG generates progressively lower grade steam in each successive boiler stage, wherein the steam is channeled from the HRSG to the steam turbine engine. More specifically, known HRSGs are capable of generating relatively high pressure steam in a high pressure portion of the HRSG. After heat is removed from the gas in the high pressure stage, the gas is then channeled to an intermediate pressure stage to generate an intermediate pressure steam and the gas is then channeled to a low pressure stage of the HRSG to generate a low pressure steam. The conditions of the high pressure, intermediate pressure and low pressure steam from the HRSG may be adjusted to be suitable for admission into the high pressure (HP), intermediate pressure (IP) and low pressure (LP) portions of the steam turbine engine (respectively).

Blending steam flows from multiple HRSGs and/or multiple sections of one HRSG can be a difficult operation. Such steam blending requires skilled combined-cycle plant operators to properly control the various valves, attemporators, steam drums and other equipment associated with the HRSGs and steam turbine engine to minimize process disturbances. Examples of process disturbances include improper blending, which causes drum levels to change rapidly and/or pressures and temperatures of the steam to change in an undesirable manner. Continued operation with such process disturbances can force the shutdown of the power generation system, depriving the utility of a power supply and/or causing the utility to incur undesirable costs. Moreover, the process disturbances can cause damage to the HRSG and/or can lead to a premature failure of the HRSG and/or the power generation system.

BRIEF DESCRIPTION OF THE INVENTION

In one embodiment, a method for controlling the operation of a steam generation system is provided. Fluid flow is channeled from at least one first boiler within at least one conduit. Fluid flow is added within the conduit from at least one second boiler. At least one operating condition within the first and second boilers is detected. A fluid pressure set point and/or a fluid temperature set point for each boiler is determined based on the operating condition detected for each boiler. A fluid pressure and/or a fluid temperature is maintained within the first and second boiler to be approximately equal to the fluid pressure set point and the fluid temperature set point for each boiler, respectively, prior to fluid flow being channeled and/or during the channeling of fluid flow from the first boiler and/or the second boiler within the conduit to a steam process and/or at least one steam turbine engine.

In another embodiment, a control system is provided. The control system includes at least one sensor configured to detect at least one operating condition within at least one first boiler and at least one second boiler. A controller is coupled to the sensor. The controller is configured to determine a fluid pressure set point and/or a fluid temperature set point for each of the first and second boiler based on the operating condition detected for each of the first and second boiler. The controller is also configured to maintain a fluid pressure and/or a fluid temperature within each of the first and second boiler to be approximately equal to the determined fluid pressure set point and the fluid temperature set point for each of the first boiler and second boiler, respectively, prior to fluid flow being channeled and/or during the channeling of fluid flow from the first boiler and/or the second boiler to a steam process and/or at least one steam turbine engine.

In yet another embodiment, a steam generation system is provided. The steam generation system includes at least one first boiler for channeling fluid flow within at least one conduit. At least one second boiler is coupled to the conduit for channeling additional fluid flow within the conduit. The steam generation system includes a control system that is coupled to each of the first and second boiler. The control system includes at least one sensor that is configured to detect at least one operating condition within each of the first and second boiler. The control system also includes a controller that is coupled to the sensor. The controller is configured to determine a fluid pressure set point and/or a fluid temperature set point for each of the first and second boiler based on the operating condition detected for each of the first and second boiler. The controller is also configured to maintain a fluid pressure and/or a fluid temperature within each of the first and second boiler to be approximately equal to the determined fluid pressure set point and the fluid temperature set point for each of the first and second boiler, respectively, prior to fluid flow being channeled and/or during the channeling of fluid flow from the first boiler and/or the second boiler to a steam process and/or at least one steam turbine engine.

DETAILED DESCRIPTION OF THE INVENTION

The exemplary methods and systems described herein provide a control system that may be used with a steam generation system that includes a steam system or a boiler used to generate and channel fluid to a steam process and/or a steam turbine engine. The control system uses various process parameters and conditions to prevent process disturbances such as changes in, for example, the pressure and temperature of fluid flow within the steam generation system when additional steam system(s) or boiler(s) are added to the steam generation system such that any steam flow being channeled to the steam process and/or steam turbine engine is regulated. More specifically, the control system includes at least one sensor configured to detect at least one operating condition within at least one first boiler and at least one second boiler. A controller is coupled to the sensor. The controller is configured to determine a fluid pressure set point and/or a fluid temperature set point for each of the first and second boiler based on the operating condition detected for each of the first and second boiler. The controller is also configured to maintain a fluid pressure and/or a fluid temperature within each of the first and second boiler to be approximately equal to the determined fluid pressure set point and the fluid temperature set point for each of the first boiler and second boiler, respectively, prior to fluid flow being channeled and/or during the channeling of fluid flow from the first boiler and/or the second boiler to a steam process and/or at least one steam turbine engine. By using various process parameters and conditions to maintain the fluid pressure and/or fluid temperature within the steam generation system, process disturbances are prevented when additional steam systems or steam boilers are added to the steam generation system. Accordingly, the steam generation system operates more effectively and damage to, and/or failure of, each boiler and/or the steam generation system is prevented.

Figure 1:
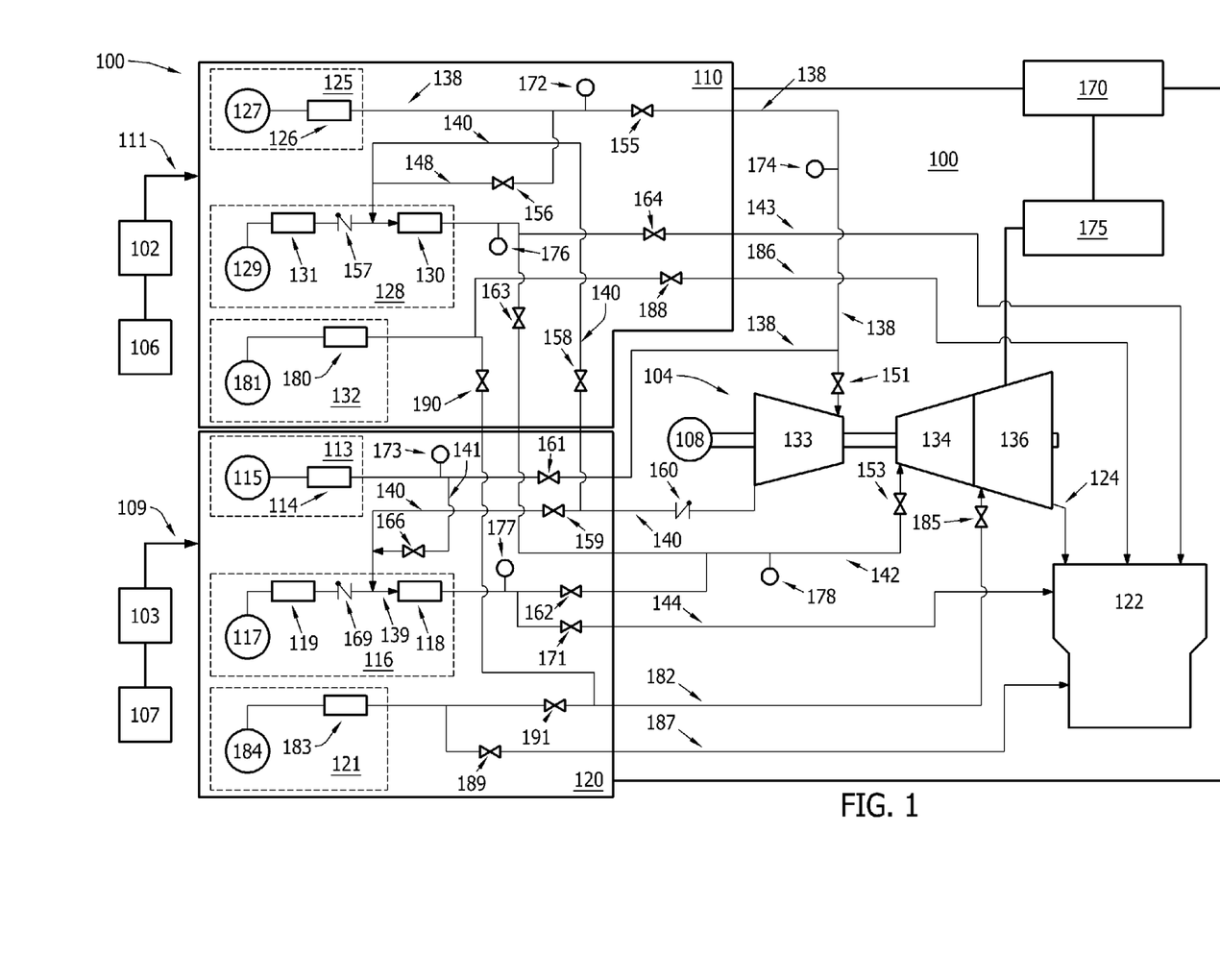
FIG. 1 is a block diagram of an exemplary steam generation system.

FIG. 1 is a schematic illustration of an exemplary steam generation system 100. More specifically, in the exemplary embodiment, system 100 is a combined-cycle power generation system. Although the exemplary embodiment illustrates a combined-cycle power generation system, the present invention is not limited to combined-cycle power generation systems, and one of ordinary skill in the art will appreciate that the current invention may be used in connection with any type of steam generation system.

In the exemplary embodiment, system 100 includes at least two heat sources 102 and 103. More specifically, in the exemplary embodiment, heat source 102 and 103 are gas turbine engines. While gas turbine engines 102 and 103 are illustrated in the exemplary embodiment, it should be noted that system 100 may include any other type of heat source that enables system 100 to function as described herein. System 100 also includes at least one steam turbine engine 104. Alternatively, in place of steam turbine engine 104, system may include a steam process, such as, for example, carbon sequestration.

In the exemplary embodiment, gas turbine engine 102, gas turbine engine 103, and steam turbine engine 104 are each mechanically coupled to electric power generators 106, 107, and 108, respectively. System 100 also includes at least two steam boilers 110 and 120 that are coupled in flow communication with gas turbine engines 102 and 103, respectfully, via exhaust gas conduits 111 and 109, respectfully. In the exemplary embodiment, each steam boiler 110 and 120 are heat recovery steam generators (HRSGs). While HRSGs 110 and 120 are illustrated in the exemplary embodiment, it should be noted that system 100 may include any other number of or type of steam systems or boilers that enable system 100 to function as described herein.

It should also be noted that, as used herein, the term "couple" is not limited to a direct mechanical, thermal, communication, and/or an electrical connection between components, but may also include an indirect mechanical, thermal, communication and/or electrical connection between multiple components. While the exemplary embodiment illustrates two gas turbine engines 102 and 103, two HRSGs 110 and 120, and a single steam turbine engine 104, it should be further noted that, alternatively, system 100 may include any number of gas turbine engines, any number of HRSGs, and any number of steam turbine engines or steam processes that enable system 100 to function as described herein. Also, system 100 may include any number of gas turbine engines coupled to any number of HRSGs.

In the exemplary embodiment, steam turbine engine 104 is also coupled in flow communication with a condenser 122 via a low pressure steam exhaust conduit 124. In the exemplary embodiment, HRSG 110 includes a unit high pressure (HP) steam section 125 that includes an HP steam superheater 126 and an HP steam drum 127, an intermediate pressure (IP) steam section 128 that includes an IP steam drum 129, a IP steam superheater 131, an IP steam check valve 157 and a reheat (RH) steam reheater 130, and a low pressure (LP) steam section 132 that includes a LP steam superheater 180 and a LP steam drum 181. Similarly, HRSG 120 also includes a unit HP steam section 113 that includes an HP steam superheater 114 and an HP steam drum 115, an IP steam section 116 that includes an IP steam drum 117, a IP steam superheater 119, an IP steam check valve 169 and a RH steam reheater 118, and a LP steam section 121 that includes a LP steam superheater 183 and a LP steam drum 184. Steam turbine engine 104, in the exemplary embodiment, includes an HP section 133, an IP section 134, and an LP section 136.

In the exemplary embodiment, an HP common steam conduit 138 extends from each HRSG HP steam section 125 and 113 to HP section 133. A cold reheat (CRH) common steam conduit 140 extends from ST HP section 133 to each IP steam superheater exit 131 and 119 and to each RH steam reheater inlet 130 and 118. A RH common steam conduit 142 extends from RH steam reheater exit 130 and 118 to ST IP section 134. A hot reheat (HRH) bypass conduit 143 extends from RH steam reheater exit 130 and 118 to condenser 122. In the exemplary embodiment, an HP bypass conduit 148 extends from HP steam section 125 to reheater 130. Likewise, HP bypass conduit 149 extends from HP steam section 113 to Reheater 118. An LP steam conduit 183 extends from LP superheater 181 to ST LP section 136. An LP common steam conduit 182 extends from LP superheater 183 to LP section 136. An LP bypass conduit 186 extends from LP section 132 to condenser 122. An LP bypass conduit 187 extends from LP section 121 to condenser 122. A conduit 141 extends from conduit 138 to lead unit HP bypass valve 166.

System 100 further includes a ST main stop valve/control valve (MSV/CV) 151 that is positioned in HP steam conduit 138 within steam turbine engine 104 just upstream of ST HP section 133. A ST RH stop valve/intercept control valve (RSV/IV) 153 is positioned in HRH steam conduit 142 within steam turbine engine 104 just upstream of ST IP section 134.

The term "lead unit" refers to the steam boiler that may be coupled in flow communication with steam turbine engine 104. The term "lag unit" refers to the steam boiler that is not initially coupled in flow communication with steam turbine engine 104 and is not channeling fluid flow, such as steam flow to steam turbine engine 104. Instead, the lag unit is channeling steam flow to condenser 122. In the exemplary embodiment, the steam boiler 120 is the lead unit and is channeling fluid flow, such as steam flow, to steam turbine engine 104. More specifically, in the exemplary embodiment, I-IRSG 120 is the lead unit and is coupled in flow communication with steam turbine engine 104, and HRSG 120 is channeling steam flow to steam turbine engine 104. HRSG 110, in the exemplary embodiment, is the lag unit and is not initially coupled in flow communication with steam turbine engine 104. HRSG 110 is also not channeling steam flow to steam turbine engine 104. Instead, HRSG 110 is channeling steam flow to condenser 120. Alternatively, HRSG 120 may be lag unit and HRSG 110 may be the lead unit.

Moreover, in the exemplary embodiment, HP common steam conduit 138, CRH common steam conduit 140, RH common steam conduit 142, and LP common steam conduit 182 are shared by each lead and lag unit(s) and therefore, are also known as common steam header conduits.

A lag unit HP steam check valve 155 is positioned in HP steam conduit 138 between MSV/CV 151 and HP steam section 125. System 100 also includes a lag unit HP bypass valve 156 positioned in HP bypass conduit 148 downstream of HP steam check valve 155. A lag unit IP steam check valve 157 is positioned between IP steam superheater 131 and RH steam reheater 130. Just upstream from RH steam reheater 130, a lag unit CRH steam isolation valve 158 and a lead unit CRH steam isolation valve 159 are each positioned in steam conduit 140. A lead unit CRH steam check valve 160 is also positioned within conduit 140 just upstream from lead unit CRH steam isolation valve 159. A lead unit HP steam check steam valve 161 is positioned in HP steam conduit 138 just upstream from MSV/CV 151. System 100 also includes a lead unit RH steam check valve 162 and a lag unit HRH steam check valve 163 that are each positioned in RH steam conduit 142. A lag unit RH bypass valve 164 is positioned in HRH bypass conduit 143. A lead unit RH bypass valve is positioned in conduit 141. A lag unit LP bypass valve 188 is positioned in conduit 186 and a lag unit LP steam check valve 190 is positioned in conduit 183. An admission SV/CV 185 is positioned downstream of steam turbine engine LP section 136. A lead unit RH bypass valve 171 is positioned in conduit a 144. A lead unit LP steam check valve 191 is positioned in conduit a 182. A lead unit LP bypass valve 189 is positioned in a conduit 187.

In the exemplary embodiment, system 100 also includes a control system 170 coupled to each HRSG 110 and 120. In the exemplary embodiment and as explained in more detail below, control system 170 is configured to detect at least one operating parameter or condition for each HRSG 110 and 120. More specifically, control system 170 is configured to detect at least one operating parameter or condition within each section of each HRSG 110 and 120, such as HP steam sections 125 and 113, IP steam sections 128 and 118, and/or LP steam sections 132 and 121, respectively. In the exemplary embodiment, the operating parameters or conditions include a drum level, such as a drum water level, a drum pressure, a fluid flow rate, such as a steam flow rate, a fluid pressure, such as a steam pressure, and a fluid temperature, such as a steam temperature. The operating parameters or conditions may also include a change in the drum level, a change in the drum pressure, a change in the fluid flow rate, a change in the fluid pressure, and a change in the fluid temperature.

The operating parameters or conditions may also include a loading rate for steam turbine engine 104, such as the loading rate of fluid flow for steam turbine engine 104. The operating parameters and conditions may also include temperature parameters within each superheater 126, 131, 180, 114, 119, and 183. The operating parameters or conditions may also include the difference between the pressures within each section of each HRSG 110 and 120, such as HP steam sections 125 and 113, IP steam sections 128 and 118, and/or LP sections 132 and 121, respectively. The operating parameters or conditions may also include the difference in drum pressures between HRSG 110 and 120. The operating parameters or conditions may also include user input. Alternatively, control system 170 may detect any other parameters or conditions for each HRSG 110 and 120 that enables control system 170 and system 100 to function as described herein. In the exemplary embodiment, control system 170 may detect the operating parameters continuously in real time and/or at various set times. Moreover, in the exemplary embodiment, system 100 includes a steam turbine or process control system 175 that is configured to detect the operating parameters or conditions within each of HP section 133, IP section 134, and LP section 136 of steam turbine engine 104. In the exemplary embodiment, steam process control system 175 is separate from and external to control system 170. Alternatively, steam process control system 175 may be positioned within and part of control system 170. Control system 170 could also be configured to detect the operating parameters or conditions within each of HP section 133, IP section 134, and LP section 136 of steam turbine engine 104.

In the exemplary embodiment and as explained in more detail below, control system 170 is also configured to determine a fluid pressure set point, such as a steam pressure set point, and/or a fluid temperature set point, such as a steam temperature set point, for each HRSG 110 and 120. More specifically, control system 170 is configured to determine a steam pressure set point and/or a steam temperature set point for each section within each HRSG 110 and 120, such as HP steam sections 125 and 113, IP steam sections 128 and 118, and/or LP steam sections 132 and 121, based on the respective parameters and conditions detected. Moreover, in the exemplary embodiment, control system 170 is configured to maintain the steam pressure and/or the steam temperature within each HRSG 110 and 120. More specifically, control system 170 is configured to maintain the steam pressure and/or the steam temperature within each section of each HRSG 110 and 120, such as HP steam sections 125 and 113, IP steam sections 128 and 118, and/or LP steam sections 132 and 121, at approximately the respective steam pressure set point and steam temperature set point that is determined for each section of each HRSG 110 and 120, such as HP steam sections 125 and 113, IP steam sections 128 and 118, and/or LP steam sections 132 and 121.

In the exemplary embodiment, control system 170 is operatively coupled to various valves, such as lag unit HP steam check valve 155, lag unit HP bypass valve 156, lag unit IP steam check valve 157, lag unit CRH steam isolation valve 158, lead unit CRH steam isolation valve 159, lead unit CRH steam check valve 160, lead unit HP steam check steam valve 161, lead unit HRH steam check valve 162, lag unit HRH steam check valve 163, lag unit RH bypass valve 164, lead unit HP bypass valve 166, lead unit LP steam check valve 190, lag unit LP bypass valve 188, lead unit RH bypass valve 171, lead unit LP steam check valve 191, and lead unit LP bypass valve 189. Control system 170 is configured to control to control lag unit CRH steam isolation valve 158 and lead unit CRH steam isolation valve 159 to facilitate controlling the flow of steam within conduit 140. Control system 170 is configured to control lag unit RH bypass valve 164 to facilitate controlling the flow of steam within conduit 143. Control system 170 is also configured to control lag unit LP bypass valve 188 to facilitate controlling the flow of steam within conduit 186. Further, Control system 170 is configured to control lead unit RH bypass valve 171 to facilitate controlling the flow of steam within conduit 144. Control system 170 is also configured to control lead unit LP bypass valve 189 to facilitate controlling the flow of steam within conduit 187. In the exemplary embodiment, controls system 170 is also configured to control lead unit HP bypass valve 166 to facilitate controlling the flow of steam within conduit 141. Control system 170 is also configured to control lag unit HP bypass valve 156 to facilitate controlling the flow of steam within More specifically, in the exemplary embodiment, control system 170 is enabled to facilitate operative openings and closing features of lag unit CRH steam isolation valve 158 and lead unit CRH steam isolation valve 159, via features that include, without limitation, receiving permissive inputs, transmitting permissive outputs, and transmitting opening and closing commands. Moreover, control system 170 is enabled to facilitate modulating lag unit HP bypass valve 156, lead unit HP bypass valve 166, lag unit RH bypass valve 164, LP bypass valve 188, lead unit RH bypass valve 171, and lead unit LP bypass valve 189 via features that include, without limitation, receiving permissive inputs and transmitting permissive outputs.

In the exemplary embodiment, a lag unit HP header pressure 172 is the pressure of steam being channeled from HP steam section 125. A lead unit HP header pressure 173 is the pressure of steam being channeled from HP steam section 113. An HP common header pressure 174 is the pressure of the steam being channeled to steam turbine HP section 133. A lag unit HRH header pressure 176 is the pressure of steam being channeled from IP section 128 within conduits 140 and 148, which includes CRH steam and HP bypass steam, respectively. A lead unit HRH header pressure 177 is the pressure of steam being channeled from IP section 116 within conduits 141 and 139, which includes CRH steam and HP bypass steam, respectively. An HRH common header pressure 178 is the pressure of the steam being channeled to steam turbine IP section 134.

During operation, in the exemplary embodiment, process gases are channeled to gas turbine engine 102 and gas turbine engine 103 for combustion and each gas turbine engine 102 and 103 generates power used to drive generator 106 and 107, respectively. Generators 106 and 107 supply electrical power to a power grid (not shown). Moreover, in the exemplary embodiment, exhaust gases from gas turbine engines 102 and 103 are channeled to HRSG 110 and 120, respectively, wherein the exhaust gases heat is used to generate steam. Steam generated within HRSG 110 and/or HRSG 120 may then be channeled to steam turbine engine 104 to enable steam turbine engine 104 to rotate to generate power. Power generated by steam turbine engine 104 drives generator 108 such that electrical power is transmitted to the power grid. Alternatively, steam may be diverted to condenser 122 instead.

When steam flow is channeled from one HRSG 120 to steam turbine engine 104 and then steam flow is added from HRSG 110, process disturbances may occur. For example, the parameters or conditions of the steam flow, such as pressure and temperature, may vary. Such variations may cause disruptions within steam generation system 100 and as a result, the operation of system 100 may be difficult. Accordingly, control system 170 controls such process disturbances to acceptable levels, such as, for example, variations in the pressure and/or temperature of the fluid flow, such as steam flow, within each HRSG 110 and 120. For example, control system 170 may substantially reduce undesired changes in the pressure and temperature of each section of each HRSG 110 and 120, such as HP steam sections 125 and 113, IP steam sections 128 and 116, and/or LP steam sections 132 and 121, respectively.

As explained in more detail below, control system 170 controls the steam flow from the lag unit to steam turbine engine 104 and facilitates the steam within the lag unit to be in a condition that is appropriate for steam turbine engine 104 prior to the steam flow being channeled and/or during the channeling of the steam flow to steam turbine engine 104. For example, control system 170 detects at least one operating parameter or condition within each HRSG 110 and 120. More specifically, control system 170 detects at least one operating parameter or condition within each section of each HRSG 110 and 120, such as HP steam sections 125 and 113, IP steam sections 128 and 116, and/or LP steam sections 132 and 121, respectively.

In the exemplary embodiment, as explained in more detail below, control system 170 then determines a steam pressure set point and/or a steam temperature set point for each section of each HRSG 110 and 120, such as HP steam sections 125 and 113, IP steam sections 128 and 116, and/or LP steam sections 132 and 121, based on the respective parameters detected. Control system 170 then maintains a steam pressure within each HP steam sections 125 and 113, IP steam sections 128 and 116, and/or LP steam sections 132 and 121 at approximately the respective steam pressure set points and/or the steam temperature set points that are determined. Control system 170 maintains the steam pressure within each HP steam sections 125 and 113, IP steam sections 128 and 116, and/or LP steam sections 132 and 121 by modulating steam pressure and steam temperature setpoints so that at least one of lag unit HP bypass valve 156, lag unit, lead unit HP bypass valve 166, lag unit RH bypass valve 164, lag unit LP bypass valve 188, lead unit RH bypass valve 171, and/or lead unit LP bypass valve 189 are modulated to control or regulate the flow of steam within system 100. Control system 170 may also open or close CRH steam isolation valve 158 and/or lead unit CRH steam isolation valve 159.

Figure 2:
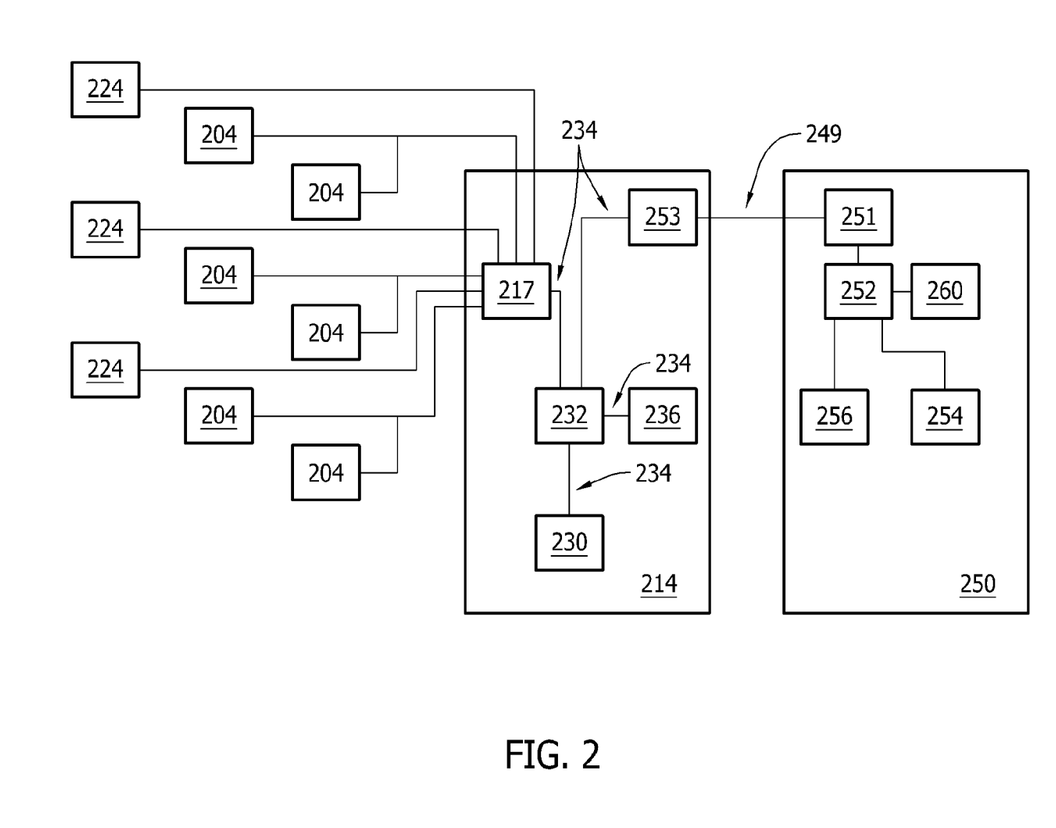
FIG. 2 is a block diagram of a control system that may be used with the steam generation system shown in FIG. 1.

FIG. 2 is a schematic diagram of control system 170. In the exemplary embodiment, control system 170 includes at least one sensor or transducer 204. In the exemplary embodiment, a plurality of sensors 204 may each positioned in close proximity to, and coupled to, each HRSG 110 and 120 (shown in FIG. 1). More specifically, in the exemplary embodiment, each sensor 204 may positioned in close proximity to and coupled to each section within each HRSG 110 and 120, such HP steam sections 125 and 113 (shown in FIG. 1), IP steam sections 128 and 116 (shown in FIG. 1), and/or LP steam sections 132 and 121 (shown in FIG. 1). System 170 may include any number of sensors 204 that enable steam generation system 100 (shown in FIG. 1) to function as described herein. Moreover, in the exemplary embodiment, each sensor 204 detects at least one operating parameter or condition for HP steam sections 125 and 113, IP steam sections 128 and 116, and/or LP steam sections 132 and 121. In the exemplary embodiment, the operating parameters or conditions that each sensor 204 detects may include a drum level, such as a drum water level, a drum pressure, a fluid flow rate, such as a steam flow rate, a fluid pressure, such as a steam pressure, and a fluid temperature, such as a steam temperature. The operating parameters or conditions that each sensor 204 detects may also include a change in the drum level, a change in the drum pressure, a change in the fluid flow rate, a change in the fluid pressure, and a change in the fluid temperature.

The operating parameters or conditions may also include a loading rate for steam turbine engine 104 (shown in FIG. 1), such as the loading rate of fluid flow for steam turbine engine 104. The operating parameters and conditions may also include temperature parameters within each superheater 126, 131, 180, 114, 119, and 183 (shown in FIG. 1). The operating parameters or conditions may also include the difference between the pressures within each section of each HRSG 110 and 120, such as HP steam sections 125 and 113, IP steam sections 128 and 118, and/or LP sections 132 and 121, respectively. The operating parameters or conditions may include user input. Alternatively, sensors 204 may detect various other operating parameters that enable control system 170 and/or steam generation system 100 to function as described herein.

Moreover, in the exemplary embodiment, control system 170 includes a controller 214 that is coupled to each sensor 204. More specifically, controller 214 may include a sensor interface 217 and each sensor 204 may be coupled to interface 217. Each sensor 204 transmits a signal corresponding to at least a drum level, a steam pressure, a steam flow, and a steam temperature detected for each HP steam sections 125 and 113, IP steam sections 128 and 118, and/or LP sections 132 and 121 to sensor interface 217. Each sensor 204 may transmit a signal continuously, periodically, or only once, for example. Other signal timings may also be contemplated. Furthermore, each sensor 204 may transmit a signal either in an analog form or in a digital form.

Various connections are available between sensor interface 217 and sensors 204. Such connections may include, without limitation, an electrical conductor, a low-level serial data connection, such as Recommended Standard (RS) 232 or RS-485, a high-level serial data connection, such as Universal Serial Bus (USB), a field bus, a process field bus (PROFIBUS®), or Institute of Electrical and Electronics Engineers (IEEE®) 1394, a parallel data connection, such as IEEE® 1284 or IEEE® 488, a short-range wireless communication channel such as BLUETOOTH®, and/or a private (e.g., inaccessible outside steam generation system 100) network connection, whether wired or wireless. IEEE is a registered trademark of the Institute of Electrical and Electronics Engineers, Inc., of New York, N.Y. BLUETOOTH is a registered trademark of Bluetooth SIG, Inc. of Kirkland, Wash. PROFIBUS is a registered trademark of Profibus Trade Organization of Scottsdale, Ariz.

Moreover, in the exemplary embodiment, control system 170 includes at least one sensor or transducer 224 that may be positioned in close proximity to and coupled to steam turbine engine 104. More specifically, in the exemplary embodiment, sensors 224 are positioned in close proximity to and coupled to HP section 133 (shown in FIG. 1), IP section 134 (shown in FIG. 1), and LP section 136 (shown in FIG. 1). Moreover, in the exemplary embodiment, each sensor 224 detects at least one operating parameter or condition for HP section 133, IP section 134, and LP section 136. In the exemplary embodiment, the parameters or conditions may include, for example, a steam pressure and/or a steam temperature.

In the exemplary embodiment, each sensor 224 is coupled to controller 214. More specifically, each sensor 224 may be coupled to sensor interface 217. In the exemplary embodiment, each sensor 224 transmits a signal representative of a steam pressure, a steam flow or steam temperature detected for HP section 133, IP section 134, and LP section 136 to sensor interface 217. Each sensor 224 may transmit a signal continuously, periodically, or only once, for example, although other signal timings are also contemplated. Furthermore, each sensor 224 may transmit a signal either in an analog form or in a digital form.

Various connections are available between sensor interface 217 and sensors 224. Such connections may include, without limitation, an electrical conductor, a low-level serial data connection, such as Recommended Standard (RS) 232 or RS-485, a high-level serial data connection, such as USB, a field bus, a PROFIBUS®, or the Institute of Electrical and Electronics Engineers (IEEE®) 1394, a parallel data connection, such as IEEE® 1284 or IEEE® 488, a short-range wireless communication channel such as BLUETOOTH®, and/or a private (e.g., inaccessible outside steam generation system 100) network connection, whether wired or wireless.

Further, in the exemplary embodiment, controller 214 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 214 may be a microprocessor that includes read-only memory (ROM) and/or random access memory (RAM), such as, for example, a 32 bit microcomputer with 2 Mbit ROM and 64 Kbit RAM. As used herein, the term "real-time" refers to outcomes occurring in a substantially short period of time after a change in the inputs affect the outcome, with the time period being a design parameter that may be selected based on the importance of the outcome and/or the capability of the system processing the inputs to generate the outcome.

In the exemplary embodiment, controller 214 also includes a memory device 230 that stores executable instructions and/or one or more operating parameters representing and/or indicating an operating condition of steam generation system 100. More specifically, in the exemplary embodiment, memory device 230 stores the operating parameter and condition values received from HRSGs 110 and 120 via sensors 204, 206, and 208, and/or the operating parameter and condition values received from steam turbine engine 104 via sensors 224, 226, and 228.

In the exemplary embodiment, controller 214 also includes a processor 232 that is coupled to memory device 230 and sensor interface 217 via a system bus 234. In one embodiment, processor 232 may include a processing unit, such as, without limitation, an integrated circuit (IC), an application specific integrated circuit (ASIC), a microcomputer, a programmable logic controller (PLC), and/or any other programmable circuit. Alternatively, processor 232 may include multiple processing units (e.g., in a multi-core configuration). The above examples are exemplary only, and thus are not intended to limit in any way the definition and/or meaning of the term "processor." In the exemplary embodiment, processor 232 may be programmed to determine a steam pressure set point and/or a steam temperature set point for each HRSG 110 and 120. For example, processor 232 may be programmed to determine a steam pressure set point and a steam temperature set point for each HP steam sections 125 and 113, IP steam sections 128 and 118, and/or LP sections 132 and 121.

In the exemplary embodiment, processor 232 may be programmed to determine a steam pressure set point and/or a steam temperature set point for each HRSG 110 and 120 by calculating the rate of change of the steam pressure and steam temperature that processor 232 receives from each HRSG 110 and 120 via sensors 204 and/or steam turbine engine 104 via sensors 224. Alternatively, a user may determine the steam pressure set point and/or the steam temperature set point and program processor 232 with the appropriate set point values. In the exemplary embodiment, processor 232 may also be programmed to adjust the rate of change by increasing, decreasing or maintaining the steam pressure set point and/or the steam temperature set point based on the changes to the operating parameters and/or conditions within HRSGs 110 and 120 and steam turbine engine 104. For example, when the steam pressure values and steam temperature values that processor 232 receives from each HRSG 110 and 120, via sensors 204, and/or steam turbine engine 104, via sensors 224, change, then processor 232 may calculate a new average based on the new values received. Alternatively, a user may manually program changes that reflect adjusted set points to processor 232.

Moreover, in the exemplary embodiment, controller 214 includes a control interface 236 that controls an operation of steam generation system 100. In the exemplary embodiment, control interface 236 may be coupled to one or more steam generation system control devices, such as lag unit HP steam check valve 155 (shown in FIG. 1), lag unit HP bypass valve 156 (shown in FIG. 1), lag unit IP steam check valve 157 (shown in FIG. 1), lag unit CRH steam isolation valve 158 (shown in FIG. 1), lead unit CRH steam isolation valve 159 (shown in FIG. 1), lead unit CRH steam check valve 160 (shown in FIG. 1), lead unit HP steam check steam valve 161 (shown in FIG. 1), lead unit HRH steam check valve 162 (shown in FIG. 1), lag unit HRH steam check valve 163 (shown in FIG. 1), lag unit RH bypass valve 164 (shown in FIG. 1), lag unit LP bypass valve 188 (shown in FIG. 1), lead unit LP steam check valve 190 (shown in FIG. 1), lead unit RH bypass valve 171 (shown in FIG. 1), and lead unit LP bypass valve (189). In the exemplary embodiment, for example, processor 232 is programmed to generate one or more control parameters based on the signal(s) received by sensors 204 and/or by sensors 224, wherein the control parameters are transmitted to control interface 236. Control interface 236 transmits a control parameter to modulate, for example, lag unit HP bypass valve 156, lead unit HP bypass valve 166, lag unit RH bypass valve 164, lag unit LP bypass valve 188, lead unit RH bypass valve 171, and/or lead unit LP bypass valve 189. Control interface 236 may also transmit a control parameter to open or close, for example, lag unit CRH steam isolation valve 158 and/or lead unit CRH steam isolation valve 159.

Various connections are available between control interface 236 and lag unit HP steam check valve 155, lag unit HP bypass valve 156, lag unit IP steam check valve 157, lag unit CRH steam isolation valve 158, lead unit CRH steam isolation valve 159, lead unit CRH steam check valve 160, lead unit HP steam check steam valve 161, lead unit HRH steam check valve 162, lag unit HRH steam check valve 163, lag unit RH bypass valve 164, lag unit LP bypass valve 188, lead unit LP steam check valve 190, lead RH bypass valve 171, and lead LP bypass valve 189. Such connections may include, without limitation, an electrical conductor, a low-level serial data connection, such as Recommended Standard (RS) 232 or RS-485, a high-level serial data connection, such as USB, a field bus, a PROFIBUS®, or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside steam generation system 100) network connection, whether wired or wireless.

In the exemplary embodiment, control system 170 also includes a user computing device 250 that is coupled to controller 214 via a network 249. More specifically, user computing device 250 includes a communication interface 251 that is coupled to a communication interface 253 contained within controller 214. User computing device 250 includes a processor 252 for executing instructions. In some embodiments, executable instructions are stored in a memory device 254. Processor 252 may include one or more processing units (e.g., in a multi-core configuration). Memory device 254 is any device allowing information, such as executable instructions and/or other data, to be stored and retrieved.

User computing device 250 also includes at least one media output component 256 for use in presenting information to a user (not shown). Media output component 256 is any component capable of conveying information to the user. Media output component 256 may include, without limitation, a display device (e.g., a liquid crystal display (LCD), an organic light emitting diode (OLED) display, or an audio output device (e.g., a speaker or headphones)).

Moreover, in the exemplary embodiment, user computing device 250 includes input interface 260 for receiving input from the user. Input interface 260 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of media output component 256 and input interface 260.

During operation, in the exemplary embodiment, when steam flow is channeled from one HRSG 120, for example, and then steam flow added and is channeled from the other HRSG 110, the parameters or conditions of the steam flow, such as pressure and temperature may vary. Such variations may cause disruptions within steam generation system 100 and as a result, the operation of system 100 may be difficult. Accordingly, control system 170 prevents changes or variations, for example, in the pressure and temperature of the steam flow within each HRSG 110 and 120.

In the exemplary embodiment, as steam flows within each HRSG 110 and 120, control system 170 detects at least one operating parameter or condition within each HRSG 110 and 120. More specifically, in the exemplary embodiment, each sensor 204 detects at least one operating parameter or condition, such as, for example a drum level, a pressure, such as drum pressure, a steam flow, a steam pressure, a steam temperature, a change in the drum level, a change in the pressure, such as a change in drum pressure, a change in the steam flow, a change in the steam pressure, a change in the steam temperature within HP sections 125 and 113, IP sections 128 and 116, and LP sections 132 and 121. Moreover, at the same time, control system 170 and/or steam process control system 175 may also detect at least one operating parameter within steam turbine engine 104. For example, each sensor 224 detects at least one operating parameter or condition, such as a steam pressure and/or a steam temperature within HP section 133, IP steam section 134, and LP section 136. Alternatively, operating parameters or conditions may be detected within any other component of steam generation system 100.

Each sensor 204 and 224 transmits a signal representative of the detected values to sensor interface 217. Sensor interface 217 transmits the values to memory device 230 for storage. In the exemplary embodiment, processor 232 determines a steam pressure set point and/or a steam temperature set point for each HP sections 125 and 113, IP sections 128 and 116, and LP sections 132 and 121 based on at least one of the parameters or conditions detected. More specifically, in the exemplary embodiment, processor 232 determines a steam pressure set point and/or steam temperature set point by calculating the rate of change of the steam pressure and steam temperature that processor 232 receives from each HRSG 110 and 120 via sensors 204 and/or steam turbine engine 104 via sensors 224. Alternatively, a user may determine the steam pressure set point and/or the steam temperature set point and manually input the set point values to control system 170 via input interface 260.

Moreover, based on the operating parameters or conditions detected, control system 170 may maintain appropriate conditions within each HRSG 110 and 120 and identify when steam flow can be channeled from each HRSG 110 and 120 to steam turbine engine 104. More specifically, processor 232 may compare, for example, the steam temperatures and the steam pressures detected for each HP sections 125 and 113, IP sections 128 and 116, and LP sections 132 and 121 with the respective determined steam temperature set point and the respective determined steam pressure set point. If, for example, the detected steam temperatures and steam pressures for within HRSG 120 (i.e., the lead unit) are approximately equal to the respective set points, then control system 170 may channel at least a portion of the steam flow from HRSG 120 to steam turbine engine 104. If the detected steam temperatures and steam pressures for HRSG 120 are approximately greater than or less than the respective set points, then control system 170 may control the steam flow from HRSG 120 to be channeled to condenser 122 (shown in FIG. 1).

Steam flow from HRSG 110 (i.e., the lag unit) may also be added to system 100 such that steam flow from HRSG 110 may also be channeled to steam turbine engine 104. If, for example, the detected steam temperatures and steam pressures for within HRSG 110 are approximately equal to the respective set points, then control system 170 may channel at least a portion of the steam flow from HRSG 110 to steam turbine engine 104. If the detected steam temperatures and steam pressures for HRSG 110 are approximately greater than or less than the respective set points, then control system 170 may control the steam flow from HRSG 110 to be channeled to condenser 122.

More specifically, for example, if the detected steam temperature and steam pressure within HP section 125 of lag unit HRSG 110 is approximately equal to the respective determined set point, then control system 170 modulates, for example, lag unit HP bypass valve 156 such that the steam flow may be channeled to steam turbine HP section 133. In the exemplary embodiment, for such a modulation, processor 232 transmits a signal to control interface 236 such that control interface 236 may transmit a control parameter to both HP bypass valve 156. Similarly, for example, if the detected steam temperature and steam pressure within IP section 116 of the lead unit HRSG 120 are approximately equal to the determined steam temperature set point and the determined steam pressure set point, then control system 170 modulates, for example, lead unit RH bypass valve 171 such that the steam flow may be channeled to steam turbine IP section 134. In the exemplary embodiment, for such modulations, processor 232 transmits a signal to control interface 236 such that control interface 236 may transmit a control parameter to RH bypass valve 171.

Alternatively, if the detected steam temperature and steam pressure within HP section 125 of the lag unit HRSG 110 are greater than or less than the steam temperature set point and steam pressure set point determined for HP section 125, then control system 170 modulates, for example, lag unit HP bypass valve 156 such that the steam flow is not channeled to steam turbine HP section 133. Moreover, sensor 204 may continue to detect the operating conditions within HP section 125 of the lag unit HRSG 110 and when the detected steam temperature and steam pressure within HP section 125 of the lag unit HRSG 110 are approximately equal to the respective set point values, then control system 170 may modulate lag unit HP bypass valve 156 such that steam flow may again be channeled to steam turbine HP section. Similarly, each sensor 204 may continue to detect the operating conditions within each section of each HRSG 110 and 120 and when any detected steam temperatures and steam pressures are approximately equal to the respective set point values, then control system 170 may enable the steam to be channeled to steam turbine engine 104.

Moreover, in the exemplary embodiment, the determined steam pressure and steam temperature set point values may be adjusted upon detecting varying operating parameters and conditions within each HRSG 110 and 120 and/or steam turbine engine 104. More specifically, when the steam pressure values and steam temperature values that processor 232 receives from each HRSG 110 and 120, via sensors 204, and/or steam turbine engine 104 via sensors 224 change, then processor 232 may calculate new steam pressure and steam temperature setpoint by calculating the rate of change of the steam pressure and steam temperature that processor 232 receives from each HRSG 110 and 120 via sensors 204, and/or steam turbine engine 104 via sensors 224. Alternatively, a user may manually program changes that reflect adjusted set points to processor 232.

Moreover, in the exemplary embodiment, a user can manipulate the calculated steam pressure set points and/or control functions via computing device 250 to enable steam generation system 100 to function appropriately. For example, the user has a visual display of the steam pressure set points via media output component 256. User can input various set point values via input interface 260. User can also input various command functions via input interface 260. In such a case, processor 252 processes the input and transmits a signal to communication interface 251. Communication interface 251 transmits the information to controller 214 via network 249.

As compared to known control systems and steam generation systems, the embodiments described herein provide a control system that may be used with a steam generation system that includes a steam system or a boiler used to generate and channel fluid to a steam process and/or a steam turbine engine. The control system uses various process parameters and conditions to prevent process disturbances such as changes in, for example, the pressure and temperature of fluid flow within the steam generation system when additional steam system(s) or boiler(s) are added to the steam generation system such that any steam flow being channeled to the steam process and/or steam turbine engine is regulated. More specifically, the control system includes at least one sensor configured to detect at least one operating condition within at least one first boiler and at least one second boiler. A controller is coupled to the sensor. The controller is configured to determine a fluid pressure set point and/or a fluid temperature set point for each of the first and second boiler based on the operating condition detected for each of the first and second boiler. The controller is also configured to maintain a fluid pressure and/or a fluid temperature within each of the first and second boiler to be approximately equal to the determined fluid pressure set point and the fluid temperature set point for each of the first boiler and second boiler, respectively, prior to fluid flow being channeled and/or during the channeling of fluid flow from the first boiler and/or the second boiler to a steam process and/or at least one steam turbine engine. By using various process parameters and conditions to maintain the fluid pressure and/or fluid temperature within the steam generation system, process disturbances are prevented when additional steam systems or steam boilers are added to the steam generation system. Accordingly, the steam generation system operates more effectively and damage to, and/or failure of, each boiler and/or the steam generation system is prevented.

A technical effect of the systems and methods described herein includes at least one of: (a) channeling fluid flow from at least one first boiler within at least one conduit; (b) adding fluid flow within at least one conduit from at least one second boiler; (c) detecting at least one operating condition within each of at least one first boiler and at least one second boiler; (d) determining at least one of a fluid pressure set point and a fluid temperature set point for each of at least one first boiler and at least one second boiler based on at least one operating condition detected for each of the at least one first boiler and the at least one second boiler; and (e) maintaining at least one of a fluid pressure and a fluid temperature within each of at least one first boiler and at least one second boiler to be approximately equal to a fluid pressure set point and a fluid temperature set point for each of the at least one first boiler and the at least one second boiler, respectively, prior to fluid flow being channeled and during the channeling of fluid flow from at least one of the at least one first boiler and the at least one second boiler within the at least one conduit to at least one of a steam process and at least one steam turbine engine.

Exemplary embodiments of the systems and methods are described above in detail. The systems and methods are not limited to the specific embodiments described herein, but rather, components of the systems and/or steps of the methods may be utilized independently and separately from other components and/or steps described herein. For example, the systems may also be used in combination with other systems and methods, and is not limited to practice with only the systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling the operation of a steam generation system, the steam generation system including a lead heat recovery steam generator (lead HRSG) and a lag heat recovery steam generator (lag HRSG), said method comprising:
    determining a fluid pressure set point for a first boiler of the lag HRSG;
    channeling fluid flow from a first boiler of the lead HRSG within a first conduit, the first conduit operatively coupled to a first stage of a steam turbine engine;
    channeling fluid flow from a second boiler of the lead HRSG within a second conduit, the second conduit operatively coupled to a second stage of the steam turbine engine;
    adding fluid flow within the first conduit from the first boiler of the lag HRSG, and adding fluid flow within the second conduit from a second boiler of the lag HRSG;
    calculating an adjusted fluid pressure set point for the first boiler of the lag HRSG using as an input at least one of a detected drum level and a detected change in value of the drum level of the second boiler of the lag HRSG; and
    maintaining a fluid pressure within the first boiler of the lag HRSG to be approximately equal to the adjusted fluid pressure set point.

2. A method in accordance with claim 1, further comprising detecting a loading rate of fluid flow for steam turbine engine.

3. A method in accordance with claim 1, further comprising detecting at least one operating condition within each of the first boiler and the second boiler of the lag HRSG and the first boiler and the second boiler of the lead HRSG.

4. A method in accordance with claim 1, further comprising:
    determining a fluid pressure set point for the first boiler of the lead HRSG;
    calculating an adjusted fluid pressure set point for the first boiler of the lead HRSG using as an input at least one of the detected drum level and the detected change in value of the drum level of the second boiler of the lag HRSG; and
    maintaining a fluid pressure within the first boiler of the lead HRSG to be approximately equal to the adjusted fluid pressure set point for the first boiler of the lead HRSG.

5. A method in accordance with claim 3, wherein detecting the at least one operating condition further comprises detecting at least one of a pressure and a change in value of the pressure within each of the first boiler and the second boiler of the lag HRSG and the first boiler and the second boiler of the lead HRSG.

6. A method in accordance with claim 1, wherein maintaining the fluid pressure within the first boiler of the lag HRSG further comprises transmitting at least one control parameter via at least one signal to at least one control valve to regulate fluid flow within the steam generation system.

7. A method in accordance with claim 1, wherein a high pressure section of the lag HSG comprises the first boiler of the lag HRSG, a high pressure section of the lead HSG comprises the first boiler of the lead HRSG, an intermediate pressure section of the lag HSG comprises the second boiler of the lag HRSG, and an intermediate pressure section of the lead HSG comprises the second boiler of the lead HRSG.

8. A control system for a steam generation system, the control system comprising:
    at least one sensor configured to detect at least one of a drum level and a change in value of the drum level within a second boiler of a lag heat recovery steam generator (lag HRSG); and
    a controller coupled to said at least one sensor, said controller configured to:
        determine a fluid pressure set point for a first boiler of the lag HRSG;
        channel fluid flow from a first boiler of a lead heat recovery steam generator (lead HRSG) within a first conduit, the first conduit operatively coupled to a first stage of a steam turbine engine;
        channel fluid flow from a second boiler of the lead HRSG within a second conduit, the second conduit operatively coupled to a second stage of the steam turbine engine;
        add fluid flow within the first conduit from the first boiler of the lag HRSG, and add fluid flow within the second conduit from the second boiler of the lag HRSG;
        calculate an adjusted fluid pressure set point for the first boiler of the lag HRSG using as an input the detected at least one of the drum level and the change in value of the drum level; and maintain a fluid pressure within the first boiler of the lag HRSG to be approximately equal to the adjusted fluid pressure set point.

9. A control system in accordance with claim 8, wherein said at least one sensor is further configured to detect at least one operating condition within each of the first boiler and the second boiler of the lag HRSG and the first boiler and the second boiler of the lead HRSG.

10. A control system in accordance with claim 8, wherein said controller is further configured to:
 determine a fluid pressure set point for the first boiler of the lead HRSG;
 calculate an adjusted fluid pressure set point for the first boiler of the lead HRSG using as an input the detected at least one of the drum level and the change in value of the drum level of the second boiler of the lag HRSG; and
 maintain a fluid pressure within the first boiler of the lead HRSG to be approximately equal to the adjusted fluid pressure set point for the first boiler of the lead HRSG.

11. A control system in accordance with claim 8, wherein said at least one sensor is further configured to detect a loading rate of fluid flow for the steam turbine engine.

12. A control system in accordance with claim 8, wherein said controller is configured to maintain the fluid pressure within the first boiler of the lag HRSG by transmitting at least one control parameter via at least one signal to at least one control valve to regulate fluid flow within the steam generation system.

13. A control system in accordance with claim 8, wherein a high pressure section of the lag HSG comprises the first boiler of the lag HRSG, a high pressure section of the lead HSG comprises the first boiler of the lead HRSG, an intermediate pressure section of the lag HSG comprises the second boiler of the lag HRSG, and an intermediate pressure section of the lead HSG comprises the second boiler of the lead HRSG.

14. A steam generation system comprising:
 a lead heat recovery steam generator (lead HRSG) comprising a first boiler configured to operatively couple to a first conduit, and a second boiler configured to operatively couple to a second conduit, wherein the first conduit is operatively coupled to a first stage of a steam turbine engine and the second conduit is operatively coupled to a second stage of the steam turbine engine;
 a lag heat recovery steam generator (lag HRSG) comprising a first boiler configured to operatively couple to the first conduit, and a second boiler configured to operatively couple to the second conduit; and
 a control system coupled to each of the first boiler and said second boiler of the lag HRSG and the first boiler and the second boiler of the lead HRSG, the control system comprising:
  at least one sensor configured to detect at least one of a drum level and a change in value of the drum level within the second boiler of the lag HRSG; and
  a controller coupled to said at least one sensor, said controller configured to:
   determine a fluid pressure set point for the first boiler of the lag HRSG;
   channel fluid flow from the first boiler of the lead HRSG within the first conduit;
   channel fluid flow from a second boiler of the lead HRSG within the second conduit;
   add fluid flow within the first conduit from the first boiler of the lag HRSG, and add fluid flow within the second conduit from the second boiler of the lag HRSG;
   calculate an adjusted fluid pressure set point for the first boiler of the lag HRSG using as an input the detected at least one of the drum level and the change in value of the drum level; and
   maintain a fluid pressure within the first boiler of the lag HRSG to be approximately equal to the adjusted fluid pressure set point.

15. A steam generation system in accordance with claim 14, wherein said at least one sensor is further configured to detect at least one operating condition within each of the first boiler and the second boiler of the lag HRSG and the first boiler and the second boiler of the lead HRSG.

16. A steam generation system in accordance with claim 15, wherein said controller is further configured to:
 determine a fluid pressure set point for the first boiler of the lead HRSG;
 calculate an adjusted fluid pressure set point for the first boiler of the lead HRSG using as an input the detected at least one of the drum level and the change in value of the drum level of the second boiler of the lag HRSG; and
 maintain a fluid pressure within the first boiler of the lead HRSG to be approximately equal to the adjusted fluid pressure set point for the first boiler of the lead HRSG.

17. A steam generation system in accordance with claim 16, wherein a high pressure section of the lag HSG comprises the first boiler of the lag HRSG, a high pressure section of the lead HSG comprises the first boiler of the lead HRSG, an intermediate pressure section of the lag HSG comprises the second boiler of the lag HRSG, and an intermediate pressure section of the lead HSG comprises the second boiler of the lead HRSG.

18. A steam generation system in accordance with claim 14, wherein said at least one sensor is further configured to detect a loading rate of fluid flow for the steam turbine engine.

19. A steam generation system in accordance with claim 14, wherein said controller is configured to maintain the fluid pressure within the first boiler of the lag HRSG by transmitting at least one control parameter via at least one signal to at least one control valve to regulate fluid flow within the steam generation system.

* * * * *